UNITED STATES PATENT OFFICE.

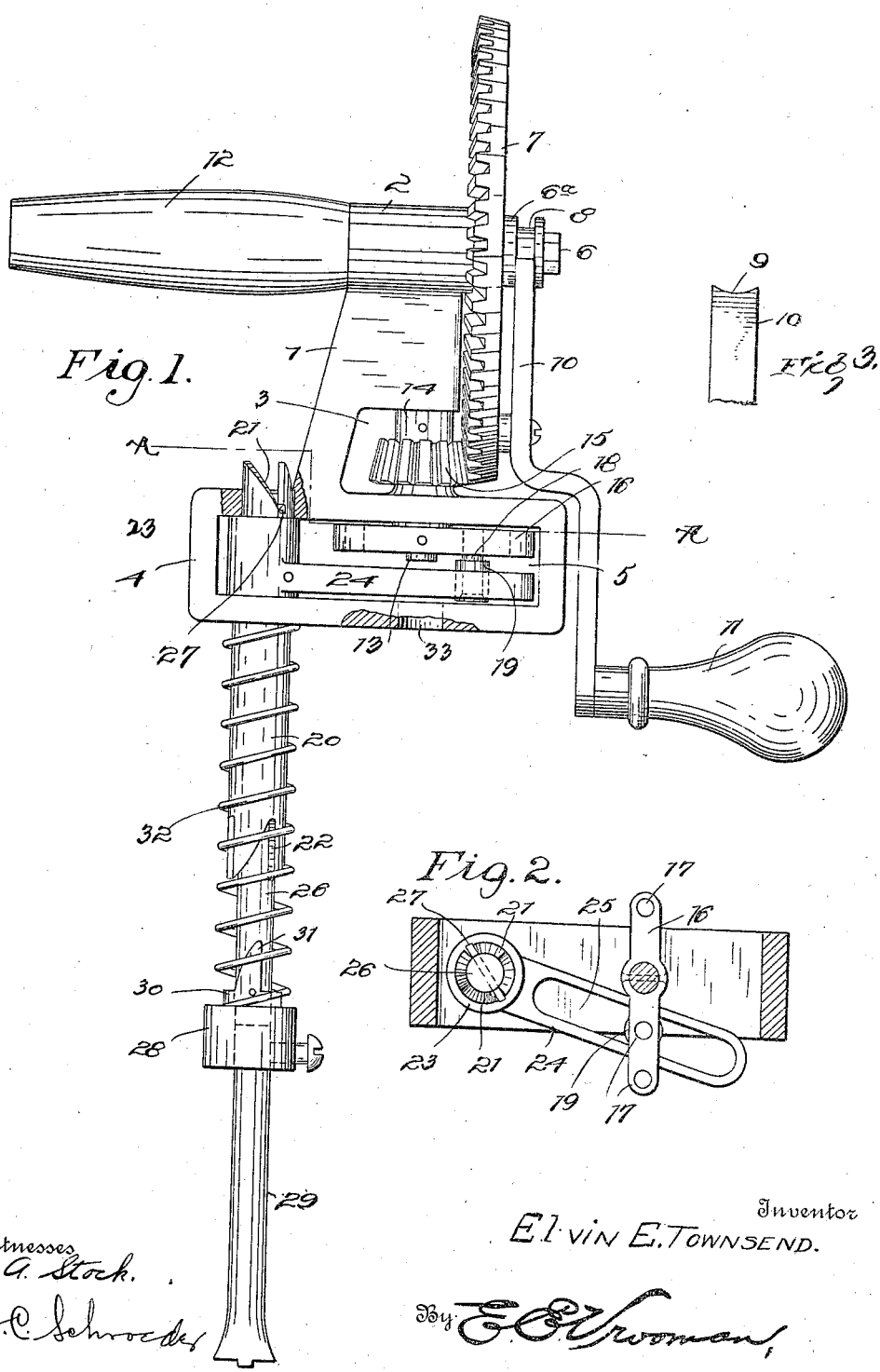

ELVIN E. TOWNSEND, OF OAKLAND, CALIFORNIA.

VALVE-GRINDER.

996,435.  Specification of Letters Patent.  Patented June 27, 1911.

Application filed October 4, 1910. Serial No. 585.200.

*To all whom it may concern:*

Be it known that I, ELVIN E. TOWNSEND, a citizen of the United States, residing at Oakland, in the county of Alameda and State of California, have invented certain new and useful Improvements in Valve-Grinders, of which the following is a specification.

This invention relates to valve seat grinders of the type shown and described in my Patent No. 959,653, dated May 31, 1910, and the principal objects of the same are to provide simple means for oscillating the valve oscillating means and for shifting the position of the seat so that oil and grit on the surface of the valve will be distributed.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation, partly in section of the improved grinder. Fig. 2 is a transverse sectional view taken on the line A—A, Fig. 1. Fig. 3 is a fragmentary view of an end portion of a drive crank forming a part of this invention.

Referring to the accompanying drawings by numerals, it will be seen that the improved grinder comprises a supporting frame, the body 1 of which has a transverse bearing 2 at the upper end, said body being provided with an intermediate transverse recess 3, and the elongated base 4 of said frame is provided with a longitudinal slot 5.

A headed shaft 6 is mounted in the bearing 2, the projected forward end thereof having the hub 6ª of a master gear 7 mounted thereon. Said hub is provided with a circumferential groove 8 that is engaged by an end notch 9 of a crank 10 that is fastened to the gear 7. Said crank is provided with a hand grip 11. The rear end of shaft 6 is equipped with a steadying handle 12.

A shaft 13 extends through recess 3 and into body 1, the lower end of said shaft projecting into base slot 5. A hub 14 of a gear 15 is fast on shaft 13 within recess 3, said gear 15 being in mesh with the master gear 7. The lower end of shaft 13 has an arm 16 fast thereon which is equipped with threaded end and intermediate openings 17 adapted to be selectively engaged by a screw 18 which carries a roller 19.

A sleeve 20 is journaled in upper and lower openings in the base 4 of the supporting frame, said sleeve extending transversely across one end of slot 5 and having its projected upper end provided with longitudinal cam grooves 21 and its lower end similarly provided with cam grooves 22. A hub 23 is fast on sleeve 20 within slot 5, said hub being of substantially the same length as the width of said slot, and equipped with a laterally projecting crank arm 24 that is provided with a longitudinal slot 25 into which the roller 19 of screw 18 projects.

A shaft 26 is longitudinally movable in sleeve 20, said shaft being provided with a transverse pin 27 in its upper end that normally rests in the cam grooves 21 in the upper end of said sleeve. The lower end of shaft 26 carries a tool socket 28 in which a valve oscillating tool 29 is detachably fastened. A collar 30 is fast on the shaft 26 adjacent the socket 28 and is equipped with a cam lug 31 for engaging the cam grooves 22 in the base of sleeve 20. A spring 32 is coiled about the lower portion of sleeve 20 and shaft 26, one end of said spring resting on socket 28 and the other end bearing against the undersurface of the base 4 of the supporting frame. An opening 33 is formed through base 4 in alinement with shaft 13, to permit said shaft to be removed from the supporting frame when released from hub 14.

In operation, arm 16 is rotated by means of gears 7, 15 and shaft 13, and the engagement of the roller 19 of arm 16 with the slot 25 of crank 24, causes said crank to oscillate and the hub of said crank being fast to sleeve 20, and the latter being engaged to shaft 26 by the end pin 27 and grooves 21, the said sleeve and shaft are also oscillated and a similar movement is imparted to the tool 29 so that said tool will similarly actuate the valve. In addition to the foregoing, it will be seen that by pressing down on the handle 12, shaft 26 moves up through sleeve 20 against the tension of spring 32 so that pin 27 is lifted from the grooves 21, and cam lugs 31 enters the grooves 22 and by contact with the cam surfaces of said grooves, rotates the said shaft independent of sleeve 20, and causes the lower edge of the tool 29 to sweep the surface being worked on so that grit, oil, and the like will be scattered. When the pressure on handle 12 is removed, spring 32 automatically returns shaft 26 so that pin 27 enters the cam grooves 22 and said grooves cause said pin to rotate the shaft in a manner the same as that just described and for the same purpose.

What I claim as my invention is:—

1. A valve grinder comprising a frame, a sleeve journaled therein and provided with upper and lower cam grooves, means for oscillating said sleeve, a shaft longitudinally movable in said sleeve, a pin carried thereby for engaging the upper cam grooves, a collar on said shaft and provided with a lug for engaging the lower cam grooves, valve oscillating means carried by said shaft, and yieldable means opposing relative movement of said shaft and sleeve.

2. A valve grinder comprising a support, a sleeve journaled therein, means carried by said support for oscillating said sleeve, said sleeve provided with upper and lower cam grooves, a shaft longitudinally movable in said sleeve, means carried by the lower portion of said shaft for engaging the lower grooves to rotate said shaft independent of said sleeve when moved upward, means carried by the upper portion of said shaft for engaging the upper grooves to rotate said shaft independent of said sleeve when moved downward, said means normally locking said shaft to said sleeve, means opposing longitudinal movement of said shaft relative to said sleeve and normally holding the upper groove engaging means in engagement with said grooves, and valve oscillating means carried by said shaft.

3. A valve grinder comprising a support, a drive shaft therein, means for rotating said shaft, an arm carried by said shaft, and provided with threaded openings, a roller adapted to be selectively engaged with said openings, a sleeve journaled in said support, a hub fast on said sleeve and provided with a crank, said crank provided with a slot into which said roller projects, and a tool operating shaft carried by said sleeve.

4. A valve grinder comprising a support, a sleeve journaled therein, mechanism carried by said support for oscillating said sleeve, a tool operating shaft longitudinally movable in said sleeve, said sleeve provided with means in its ends for rotating said shaft, a pin carried by the upper portion of said shaft for engaging the shaft rotating means in the upper end of said sleeve, a lug on the lower portion of said shaft for engaging the shaft rotating means at the lower end of said sleeve, and a spring for opposing an upward movement of said shaft and automatically moving said shaft downward to engage said pin with the shaft rotating means at the upper portion of said sleeve.

In testimony whereof I affix my signature in presence of two witnesses.

ELVIN E. TOWNSEND.

Witnesses:
H. C. SCHROEDER,
F. J. SCHROEDER.